United States Patent [19]
Lewis et al.

[11] 3,729,170
[45] Apr. 24, 1973

[54] ROTARY PLUG VALVE ASSEMBLY

[75] Inventors: George E. Lewis, Arcadia; Fernando Murman, Palos Verdes Peninsula, both of Calif.

[73] Assignee: Hydril Company, Los Angeles, Calif.

[22] Filed: Oct. 26, 1970

[21] Appl. No.: 83,948

Related U.S. Application Data

[63] Continuation-in-part of Ser. No. 800,850, Feb. 20, 1969, Pat. No. 3,589,667.

[52] U.S. Cl..................................251/315, 251/367
[51] Int. Cl................................................F16k 5/06
[58] Field of Search....................251/309, 314–317, 251/170, 171, 172

[56] References Cited

UNITED STATES PATENTS

| R24,102 | 12/1955 | Ohls | 251/172 |
|---|---|---|---|
| 2,310,583 | 2/1943 | Johnson | 251/317 |
| 2,913,219 | 11/1959 | Freed | 251/317 X |
| 3,095,177 | 6/1963 | Muller | 251/306 X |
| 3,124,334 | 3/1964 | Szohatzky | 251/317 X |
| 3,171,431 | 3/1965 | Hansen et al. | 251/315 X |
| 3,211,420 | 10/1965 | Hartmann | 251/309 |

FOREIGN PATENTS OR APPLICATIONS

| 584,184 | 9/1959 | Canada | 251/309 |
|---|---|---|---|

*Primary Examiner*—Martin P. Schwadron
*Assistant Examiner*—Richard Gerard
*Attorney*—White, Haefliger & Bachand

[57] ABSTRACT

The disclosure concerns the provision, in a valve assembly having a body, of:

a. a rotary plug stopper having an opening extending therethrough and defining a first axis;

b. trunnion means mounting said stopper for rotation within the body about a second axis to carry said opening into and out of flow passing positions;

c. an annulus extending about said trunnion means, and d. seal ring structure having a first portion extending closely about the annulus to seal off between the annulus and body and a second portion extending about the stopper in non-sealing relation therewith to permit rotation of the stopper relative to said ring second portion while said ring second portion seals off against the body.

9 Claims, 8 Drawing Figures

Patented April 24, 1973

INVENTORS.
GEORGE E. LEWIS
FERNANDO MURMAN
By
White, Haefliger & Bachand
ATTORNEYS.

Patented April 24, 1973

INVENTORS.
GEORGE E. LEWIS
FERNANDO MURMAN
By
White, Haefliger & Bachand
ATTORNEYS.

Patented April 24, 1973 3,729,170

INVENTORS.
GEORGE E. LEWIS
FERNANDO MURMAN
By
White, Haefliger & Bachand
ATTORNEYS.

Patented April 24, 1973

INVENTORS.
GEORGE E. LEWIS
FERNANDO MOXMAN
BY White, Haefliger & Bachand
ATTORNEYS.

ROTARY PLUG VALVE ASSEMBLY

This application is a continuation-in-part of my copending application Ser. No. 800,850 and now U.S. Pat. No. 3,589,667.

BACKGROUND OF THE INVENTION

This invention relates generally to oil well drilling operations, and more particularly concerns apparatus useful in controlling and preventing well blowouts.

Well blowout control and prevention equipment may be categorized as either of the type which closes the well by constricting about apparatus such as a drill string run in the well, or of the type which positively blocks the entire well passage. The former equipment is generally described in U.S. Pat. No. 2,609,836, whereas the latter equipment is exemplified by safety valves and ram type preventers. In many cases it is desired to incorporate both types of equipment in well head apparatus for increased safety; however, the possible combination of well constricting equipment with rotary plug safety valve equipment at the well head (with or without ram type preventers) has been considered as presenting certain difficulties. These include the difficulty of gaining access to the plug stopper for inspection and replacement purposes; the problem of satisfactorily sealing off between the rotary stopper and the housing therefor; the problem of particle (such as sand) accumulation between the stopper and its housing; and the difficulty of accommodating the safety valve structure to combination with the well passage constricting apparatus.

SUMMARY OF THE INVENTION

It is a major object of the invention to combine well passage constricting apparatus with safety valve structure in such manner as will alleviate the above problems and difficulties. It is another object of the invention to provide improved sealing ring structure for a safety valve employing a load transmitting trunnion or trunnions, the ring sealing off between the latter and the valve housing in such a way as to enable rotation of the valve stopper free of the sealing ring while remaining easily replaceable after disconnection of housing sections between which the ring structure also seals off.

As respects the combined safety valve and well passage constricting equipment, the invention basically comprises a housing structure defining vertically spaced chambers; an inwardly constrictable packer annulus in one of the chambers for forming therewith a vertical passage through which tubular goods may be run; an annular piston movable upwardly in that one chamber to constrict the packer for reducing the opening; a plug stopper having a through opening and mounted to rotate in another of the chambers to bring the stopper opening into and out of registration with the passage; and the housing structure including a section at the side of the plug opposite that one chamber and which is removable to provide direct access to the plug. Accordingly, the stopper may be easily removed for replacement of seal structure to be described. Typically, there is space in the stopper chamber with elastomer sealing means filling that space between the stopper and chamber inner wall, the sealant extending annularly about the through opening in the stopper when the latter is in flow passing registration with the passage, whereby sand and other particles cannot fill into that space and impede stopper rotation. This is very important in respect of subsea drilling operations, where reliability is critical. Further, a metallic seal ring may be provided to form a portion of the passage adjacent the plug, with which the metal seal has sliding and sealing contact, that ring acting to confine the elastomer sealing means against pressure induced displacement from that space. In addition, the elastomer sealing means may be formed at two generally hemispherical sections, which are removable for replacement when the housing section is removed, as described. Those sections may have terminals so located as not to be exposed to line pressure during rotation of the stopper opening in communication with those terminals; also retainer structure may block inward deflection of those terminals. Finally, stopper supporting trunnions are accommodated by the housing and sealing structure described, the trunnions being removable with the stopper, and there being operator means at the housing exterior and connected to rotate one trunnion to rotate the stopper between limits, as provided by operator piston means.

As respects sealing of the valve assembly in the housing or body, the invention comprises, in combination with the stopper and trunnion, an annulus such as a sleeve extending about the trunnion, and seal ring structure having a first portion extending closely about the sleeve to seal off between the latter and body; and a second portion extending about the stopper in non-sealing relation therewith to permit stopper rotation while the second portion seals off the body sections, as will be described. Typically, the ring structure includes a third portion like the first portion and extending about a second sleeve received over a second trunnion integral with the stopper, the trunnions rotating with the stopper but within the sleeves.

Another aspect of the invention concerns the provision of a seal ring structure as described, to be used with a plug stopper having trunnions and sleeves received on the trunnions.

These and other objects and advantages of the invention as well as the details of an illustrative embodiment, will be more fully understood from the following detailed description of the drawings, in which:

DESCRIPTION OF THE PREFFERED EMBODIMENTS

Figure 1:
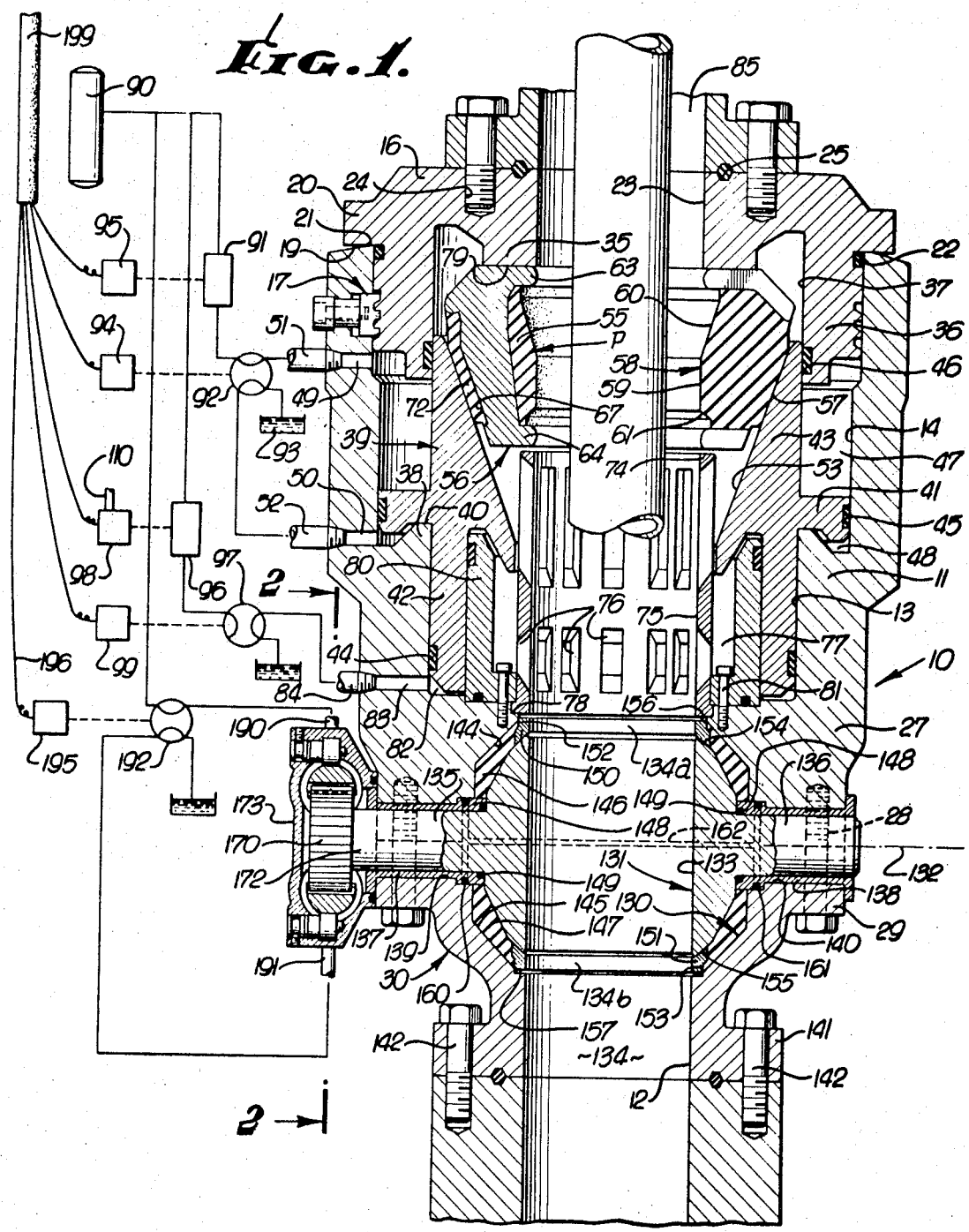
FIG. 1 is an elevation taken in section, showing the overall invention.

Turning to FIG. 1, the control head or preventer assembly, generally indicated at 10, includes a body member 11, having concentric bores 12, 13, and 14, which are of progressively increased diameters. Cap 16 is releasably held to the body member by screw threaded connection 17 in such a position that the face 19 of cap flange 20 engages the upper end 21 of the body member 11, the cap and body member being packed off at 22. Cap 16 has a bore 23 which is of the same diameter and is concentric with body bore 12. Sunk in the upper face of cap 16 are bolt holes 24 for the attachment of equipment thereabove. The annular groove 25, in that upper face, is adapted to receive a sealing ring for sealing engagement with said equipment.

The body member 11 has an attachment flange 27 whereby connection is made through bolts 28 to the flange 29 of body lower section 30 defining bore 12.

Cap 16 has an internal annular flange 35 which defines the downward continuation of bore 23, and a peripheral flange 36 which defines bore 37, said bore 37 being concentric with all the body-member bores identified above.

The body 11 has an annular, upstanding flange 38 which engages the packer actuating member 39 at 40 to limit the extent of downward movement of said member. The actuator 39 has a piston portion 41, having piston-fit in bore 14, and piston portion 42 which has a piston-fit in bore 13. The actuator is extended upwardly at 43, extension 43 having piston-fit in the bore 37. Sealing rings 44, 45 and 46 are provided between piston portions 42, 41, and 43, respectively, and the respective cylinder defining walls which receive those portions.

Piston 41 divides body bore 14 into upper (first) and lower (second) cylinders or pressure chambers 47 and 48, ports 49 and 50 opening, respectively, from those chambers. External pipes 51 and 52 open to ports 49 and 50 respectively. Note that the outer diameters (14) of chambers 47 and 48 are equal, and the inner diameters (13) and (37) of these chambers are equal, for balancing purposes.

The actuator 39 has a downwardly and inwardly tapering conical bore 53, and the actuator portion 43 which defines this bore may be considered broadly as an internal, conical wedge, or as a packer-constricting element.

Packet P includes a massive annulus or sleeve 55 of plastic and, preferably, resilient material such as rubber or Neoprene. In most instances, it is intended that a single packer be adapted for repeating opening and closing operation, and therefore it is preferable that it have relatively high resilient characteristics, so it may be self-restoring to open position when the constricting force is removed. From this point on in the description, it will be assumed that the packer has such resilient characteristics, but this assumption is not considered as limitative on my broader claims. It has been found that rubber having a durometer hardness of about 75 is suitable for general use in the packer but, again, this specification of relative hardness is not to be considered as limitative. The packer is shown as an unsplit, continuous annulus, but it will be understood that the disclosure is not limited to a packer wherein there is no split, so long as there is no angularly extending gap interrupting the continuity of the packer at times when it is radially contracted into sealing engagement with members positioned within its bore.

Included in the makeup of the packer is a series of rigid, rubber-flow-control elements 56 individually movable bodily with the rubber in its movement of radial contraction and expansion and also, to a limited extent, movable individually with respect to the rubber as will later appear. Taken together, the rigid control elements may be considered as a radially expansible and contractible armature embedded and bonded within annulus 55.

Molded annulus 55 has an outer conical face 57 which is complementary to actuator bore 53, and a bore 58 which has a central, substantially cylindrical portion 59 and oppositely inclining upper and lower portions 60 and 61, respectively; the outward flare, in each case being toward the associated end of the annulus.

It will be seen that each element 56 comprises top and bottom plates 63 and 64, respectively, rigidly connected by vertical rib 65, the outer face 67 of the rib having taper as indicated. Plates 63, 64 may be considered as transverse flanges on rib 65. Elements 56, which may be of steel bronze, or any other suitable rigid material, are preferably positioned in the rubber at the time of molding and, preferably, the rubber and the elements are bonded together by the use of suitable bonding agent during the molding process. The plates of the control elements are sectorial in shape, as viewed in plan, and are arranged in a circular series, with spaces left between the opposing side edges of the plates, both top and bottom. The plates are so sized that the two opposed side edges of adjacent elements are spaced apart, it following that as the elements move radially inward, the spaces between these, from end to end, diminish equally in width, so there is no premature interference of the plates at their inner ends and so the rubber which may flow between the plates during the constriction of the annulus will not be pinched off at the radially inward ends of the plates. See U.S. Pat. No. 2,609,836.

The annulus 55 is molded so its outer annular portion 72 projects radially outward beyond the outer faces of the plates, it following that these metallic faces do not engage the wall of the actuator bore 53. For purposes of later description, consider annular portion 72 as being that portion with extends radially from face 57 to the outer faces 67 of ribs 65.

The packer is lowered, while cap 16 is detached, into the position of FIG. 1, the annulus 55 nicely fitting the upper portion of bore 53 without requiring appreciable radial constriction of the annulus. For positively limiting the downward movement of the annulus, a stop is provided in the form of tube 74 which is retained in housing bore 15. The upper end of the tube provides the packer stop. The bore 75 of this tube is of the same diameter as bores 12 and 23, and the tube is annularly spaced from both piston portion 42 and the lower end of actuator wedge-portion 43. Ports 76 open from bore 75 to chamber 77, which latter is annularly defined by the tube 74 and the sleeve 80, while it is retained endwise by body wall 78 and the lower end of sleeve 80.

When cap 16 is subsequently secured in place, its horizontal underosurface 79 provides a stop for limiting upward movement of the packer, the upper plates 63 of control elements 56 sliding over this surface as the packer is radially constricted or expanded. Upper end of tube 74 and cap surface 79 thus form vertically spaced stops which prevent appreciable vertical movement of the packer with relation to the body member 11. Packer P is thus confined within an upper chamber formed in the housing.

It will be seen that the radial constriction of the packer is accomplished by virtue of relative vertical movement between the packer and the actuator. While the illustrated embodiment shows this relative movement as brought about by holding the packer against vertical movement with respect to the body member and then moving the actuator vertically with respect to the housing and packer, it will be understood the arrangement and operation may be reversed.

The sleeve 80 may be considered as part of the housing structure 11, to which it is retained by the fastener 81. The sleeve 80 and body 11, together with actuator piston portion 42 form a third chamber 82 to receive control pressure fluid (as via porting 83 and pipe 84) acting to urge the actuator upwardly in at least partly counterbalancing relation to the downward force exertion on the actuator. See in this regard my copending application for U.S. Letters Patent titled "WELL PRESSURE COMPENSATED BLOWOUT PREVENTER," Ser. No. 785,891 and now U.S. Pat. No. 3,533,468.

Referring again to FIG. 1, a hydropneumatic accumulator 90 is shown as communicating with pipes 51 and 52 via a suitable pressure regulator 91 and four way valve 92. In one piston of the latter, pressure fluid is delivered to pipe 51, and pressure fluid in pipe 52 is exhausted at 93 to the sea. In the alternate position of the valve 92, pressure fluid is delivered to pipe 52 and fluid in pipe 51 is exhaused to the sea. A suitable electric prime mover 94 controls valve 92 and a suitable control 95 for the regulator may be surface operated to set the pressure applied to pipes 51 and 52. Similarly, pressure may be supplied to pipe 84 via regulator 96 and four-way valve 97. Controls for the regulator and valve are indicated at 98 and 99 and may be electrically operated from the surface, to result in selected pressure applications to chamber 82, a cable to the surface being indicated at 199. Control 98 for regulator 96 may be connected via 110 to annulus or passage 85 to be responsive to mud pressure near the packer, so as to effect transmission of regulated pressure to chamber 82, in response to changes in mud pressure.

Figure 7:
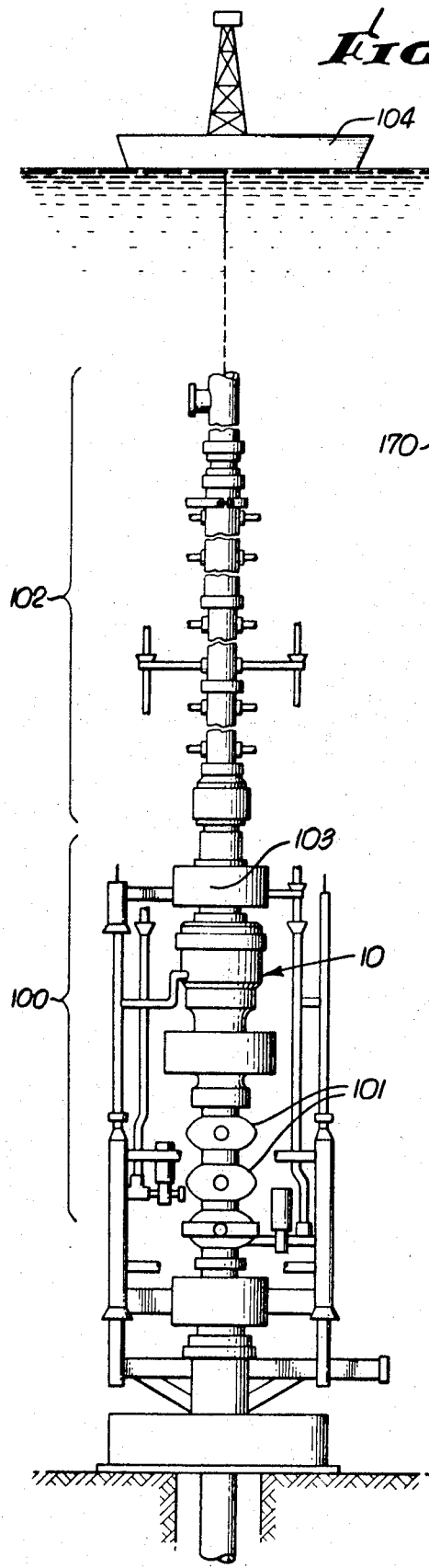
FIG. 7 is an elevation showing the blowout control equipment of the invention installed in a sub-sea well head assembly.

Reference to FIG. 7 shows the control assembly 10 connected in a sub-sea blowout preventer stack 100, including a unit 10 above a series of ram type preventers 101. A riser system 102 extends above the stack 100 and is connected thereto by a well head connector 103. Riser pipe extends to the sea surface, and typically to a drilling barge 104 or other installation. Stack 100 and riser 102 are illustrative only, and may carry the pressure vessel 90 and associated piping and controls referred to above.

A lower chamber 130 in the housing 11 contains a plug stopper 131 mounted to rotate about horizontal axis 132. Such rotation brings the through opening 133 in the stopper into and out of registration with the vertical passage 134 in the housing. In this regard, the lower section 30 of the body or housing is removable, as by disconnection of flange 29 from body portion 27 afforded by removal of bolts 28, thereby to produce direct access to the plug stopper enabling removal of the latter.

The stopper is supported for rotation by the trunnions or shafts 135 and 136 which project oppositely and in alignment with axis 132. Annuli, as for example bearing sleeves 137 and 138 extend about the trunnions and are received in the bores 139 and 140, the upper halves of which are formed by body portion 27, and the lower halves of which are formed by body lower portion 30. Accordingly, upon disconnection of the latter, the sleeves and trunnions are downwardly removable along with the plug stopper, for repair and replacement. This may be accomplished while the flange 141 of body section 30 remains bolted to well head structure therebeneath (bolts 142 affording such connection) the body section 27 and well head structure thereabove being elevated.

The space between the plug stopper and inner wall portions 144 and 145 of the body is filled with elastomer sealing means extending annularly about the through opening 133 when the latter is in FIG. 1 position, in registration with passage 134. Such sealing means may typically comprise upper and lower hard rubber hemispheres 146 and 147 which are interengaged along horizontal plane through axis 132. As seen, those hemispheres extend closely about the inner annular terminals 148 of the non-rotary sleeves 137 and 138 which engage and center the stopper within the housing chamber. O-rings 149 seal off between those terminals and the trunnions. Like rubber hemispheres 146 and 147 prevent ingress of sand or foreign matter into the space between the stopper and body during working of the well, eliminating a source of possible malfunction of the plug stopper.

Metallic seal rings 150 and 151 carried by the rubber hemispheres are slidably received in body bores 152 and 153 and form portions 134a and 134b of the passage 134 adjacent the plug stopper 131. These rings have metal-to-metal sealing contact at 154 and 155 with the stopper surface, and act to confine the elastomer material 146 and 147 against pressure induced displacement from the space between the stopper and chamber wall, particularly when the stopper opening is rotated out of registration with passage 134. Note that fluid pressure in the well is applied to end faces 156 and 157 of the seal rings to maintain the rings in contact with the stopper surface.

Figure 5:
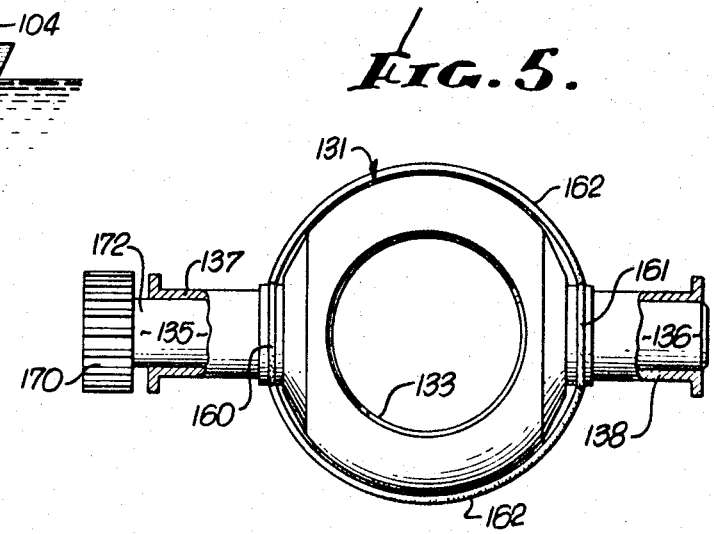
FIG. 5 is a top plan view of the FIG. 3 assembly, taken on line 5—5 of FIG. 3.
Figure 6:
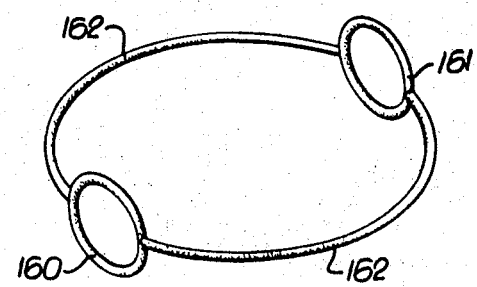
FIG. 6 is a perspective view showing the seal ring structure.

Another aspect of the invention has to do with seal ring structure having a portion or portions extending about the trunnion sleeve or sleeves to seal off between the latter and the body bores 139 and 140, and another portion extending about the stopper in non-sealing relation to permit stopper rotation while that ring portion seals off against the body (and specifically between the opposed body faces proximate the horizontal plane through axis 132). In this regard, reference to FIGS. 3-6 show the seal O-ring portions 160 and 161 which are spaced apart and sized to fit about the sleeve terminals 148 and to extend in upright planes. The seal ring structure also includes portions 162 interconnecting O-rings 160 and 161 and defining a plane normal to the planes of 160 and 161, as well as coincident with the horizontal plane through axis 132. Portions 162 are alike and sized to extend about the stopper with clearance therebetween (as seen in FIG. 5) to permit stopper rotation. Portions 162 are retained or clamped between the body elements 27 and 29, as appears in FIG. 4, to seal off therebetween.

Upon removal of the stopper, trunnions and sleeves as described above, the unitary elastomer seal structure 160, 161 and 162 is also removed and may then be replaced if necessary. By molding seal structure 160, 161 and 162 as a unit, there is no chance for well fluid outward leakage (or sea water inward leakage) past unconnected segments of installed seal, and this helps to make possible and practical the housing construction by which the plug stopper and hemispheres 146 and 147 may be removed and replaced, as described.

Figure 2:
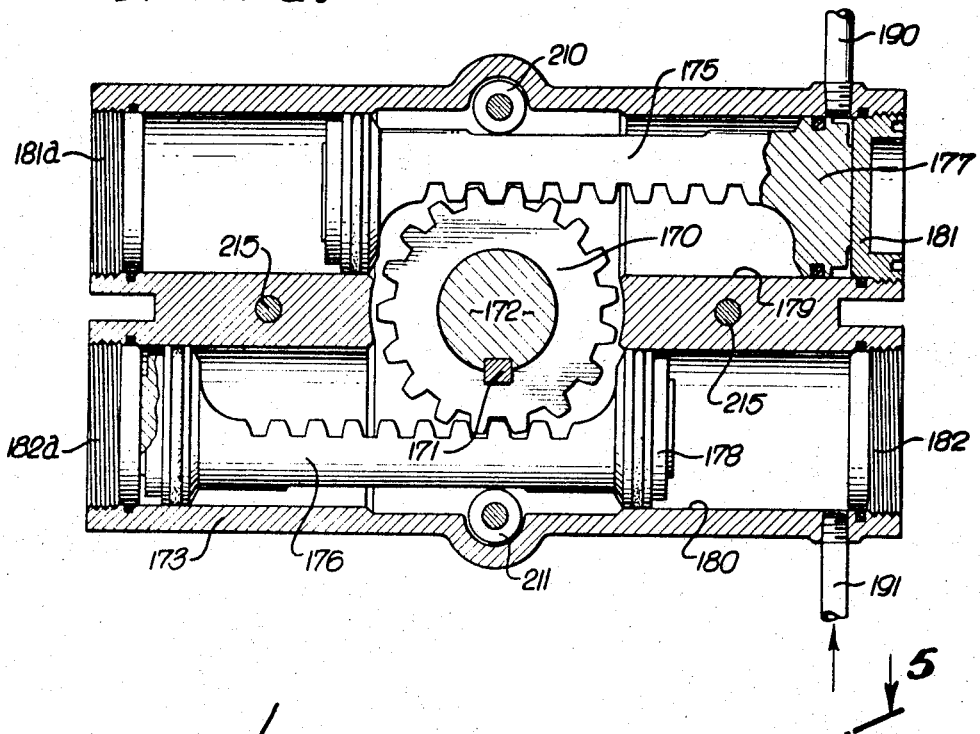
FIG. 2 is an elevation taken in section on line 2—2 of FIG. 1.
Figure 3:
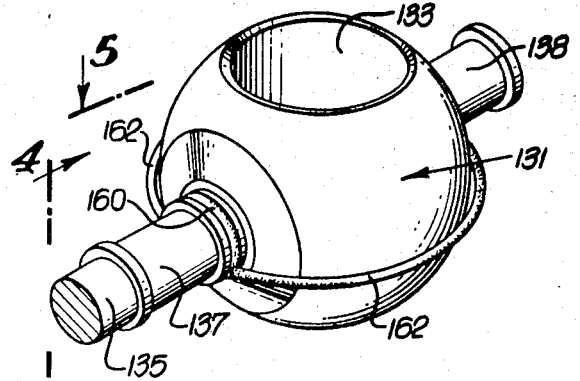
FIG. 3 is a perspective showing of the plug stopper of FIGS. 1 and 2, with seal ring structure mounted on sleeves on the stopper trunnions.
Figure 4:
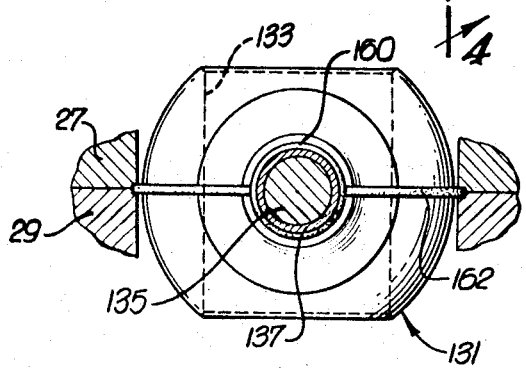
FIG. 4 is an end elevation of the FIG. 3 assembly taken on line 4—4 of FIG. 3.

Finally, operator means is provided at one side of the housing structure to transmit rotation to the plug stopper. The latter includes a pinion gear 170 keyed at 171 to extension 172 of the trunnion 135 as seen in FIGS. 1 and 2. Gear 170 is carried within a housing 173 bolted at 215 to body section 30 and to body 11 so as to be removable therefrom and with the stopper.

Located within housing 173 are upper and lower racks 175 and 176 meshing with the pinion gear and integral with pistons 177 and 178. The latter are reciprocable horizontally within cylinders 179 and 180 formed within and by the housing structure as shown, therebeing end caps 181 and 182 closing the cylinders at their heads. As fluid pressure is admitted to drive piston 177 to the left in FIG. 2, the gear is rotated by rack 175 and drives rack 176 and piston 178 to the right, thereby exhausting fluid from the space between piston 178 and tap 182. Caps 181 and 182 limit turning of the plug stopper to an angular range of about 90°, these caps, together with caps 181a and 182a being engaged by opposite ends of the pistons. Rollers 210 and 211 resist side loading of the pistons imposed by the pinion gear 170.

Pressure is transmissible from vessel 90 alternately to ports 190 and 191 under the control of four-way valve 192. An electrically energized valve driver is seen at 195. Control lines for this element is seen at 196, leading to the surface via cable 199.

Figure 8:
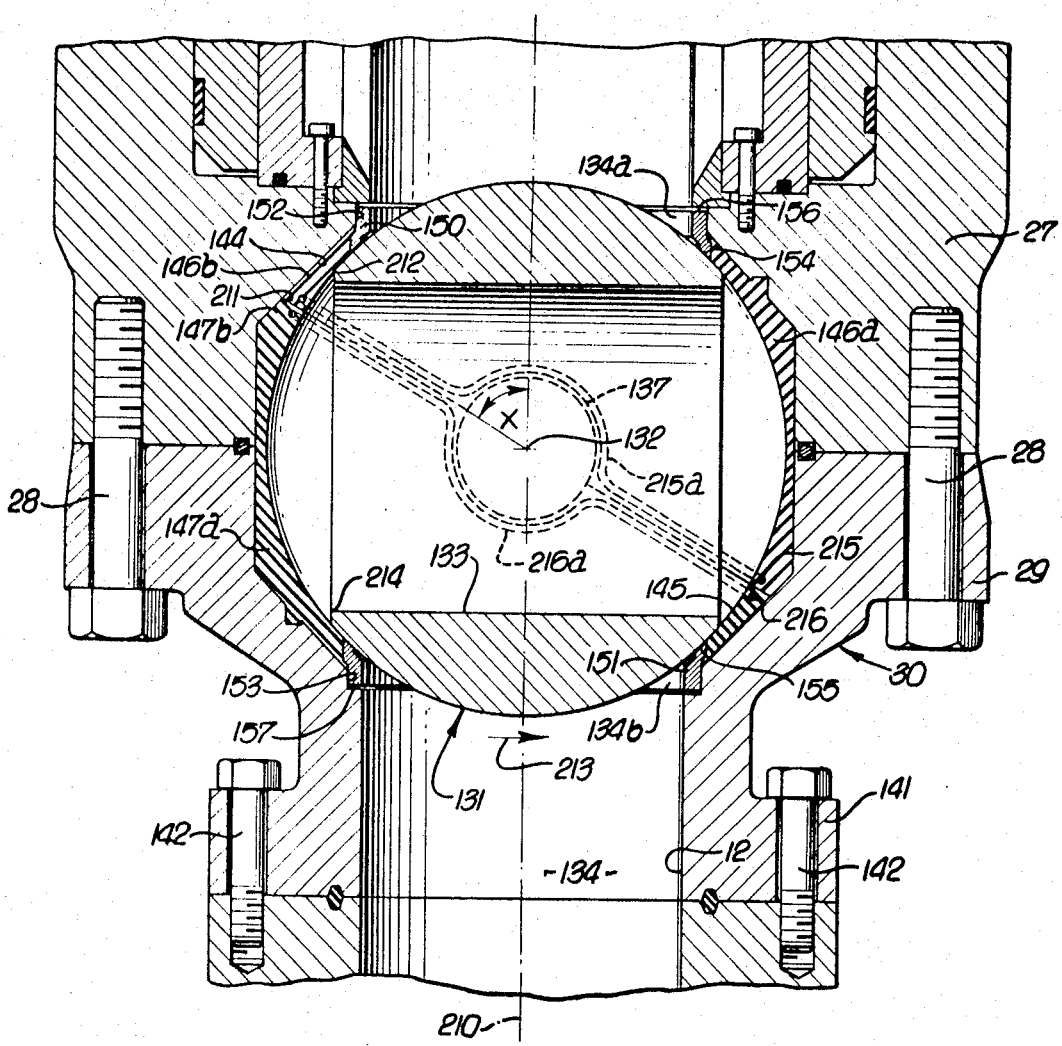
FIG. 8 is an elevation showing a modified safety valve seal arrangement.

Referring now to FIG. 8, the construction of the safety valve apparatus is similar to that of FIG. 1, with corresponding parts bearing the same identifying numbers. The modified elastomer seals 146a and 147a are alike, and again function to block ingress of sand or other foreign matter into the space between the stopper and the body. However, in this case the seals have annular terminals 146b and 147b which we mutually proximate and extend about the stopper at an angle relative to the passage axis 210 characterized in that the stopper opening 133 is directly exposed to the terminals only when that opening is rotated out of communication with the passage 134. As a result the pressure of fluid in passage 134 does not gain direct access to the split or clearance 211 between those terminals, which access would otherwise result in pressure induced inward displacement of those terminals into the stopper opening and subsequent excessive wear thereof as the stopper edge 212 traverses the clearance 211 during stopper rotation toward open position in the direction of arrow 213. As illustrated, that trailing edge traverses clearance 211 just after or at the same time that leading edge 214 of the opening 133 traverses the seal ring 151 and comes into communication with the passage 134. The angle made by the plane of clearance 211 with axis 210 is designated at X. That plane also contains the transverse axis 132 of stopper rotation as is clear from FIG. 8.

Note also the provision of retainer means extending in the modified hemispheric seals 146a and 147a and restraining the terminals 146b and 147b against inward deflection toward the stopper as the stopper opening traverses those terminals. In the illustrated example such retainer means comprise metal inserts 215 and 216 extending or embedded in these terminals and about the stopper, with insert portions 215a and 216a looping about the trunnions 135 and 136 and sleeves 137 and 138.

In FIG. 1 the metal seal rings 150 and 151 may be bonded to the rubber hemispheres 146 and 147, respectively. Likewise, the metal seal rings 150 and 151 in FIG. 8 may be bonded to the elastomer seals 146a and 147a, respectively, and the metal inserts 215 and 216 may be bonded to the seals 146a and 147a, respectively.

We claim:
1. For use in a valve assembly having a body, the combination comprising
   a. a rotary plug stopper having an opening extending therethrough and defining a first axis;
   b. trunnion means mounting said stopper for rotation within the body about a second axis to carry said opening into and out of flow passing position;
   c. an annulus extending about said trunnion means;
   d. seal ring structure having a first portion extending closely about the annulus to seal off between the annulus and body and a second portion extending about the stopper in non-sealing relation therewith to permit rotation of the stopper relative to said ring second portion while said ring second portion seals off against the body, and
   e. said body having first and second sections between which said ring second portion is confined with said sections forming a chamber receiving said stopper, the body having inlet and outlet passages with which the stopper through opening registers in flow passing position, said ring second portion extending about said first axis when the stopper is in said flow passing position.

2. The combination of claim 1 wherein the stopper is spaced from said body sections, and including elastomeric material generally filling said space to seal off between the stopper and body, but without blocking said passages.

3. The combination of claim 2 including a metallic seal ring bonded to said elastomeric material and extending about one of said passages to engage the stopper and block direct exposure of said elastomeric material to said passage in stopper flow passing position.

4. The combination of claim 1 including an operator at the side of the body and connected with said trunnion means to rotate the trunnion means and stopper.

5. The combination of claim 1 wherein the trunnion means include two trunnions extending at opposite sides of the stopper, another annulus, extending about the second trunnion, and the seal ring structure including a third portion extending closely about said other annulus to seal off between said other annulus and the body, said annuli comprising sleeves.

6. In a valve assembly,
   a. a body having an axial passage therethrough;
   b. a plug stopper having an opening therethrough and rotatable in the body and about a transverse axis to bring said opening into and out of registration with said passage, there being clearance between said stopper and body,
   c. a pair of elastomer seals in said clearance, each seal defining a port in registration with said passage, the seals having mutually proximate terminals extending about the stopper,
   d. retainer means extending in and bonded to the said seals and restraining said terminals against inward deflection toward the stopper as the stopper opening traverses said terminals during stopper rotation, and
   c. said terminals having edges defining a plane extending at an angle relative to said passage axis characterized in that said stopper opening is directly exposed to said edges only when the stopper opening is rotated out of communication with said passage.

7. The assembly of claim 6 wherein said retainer means includes metallic inserts extending about the stopper in said terminals.

8. The combination of claim 6 including metallic seal rings bonded to said elastomer seals and extending in alignment with said passage and at opposite sides of the stopper to have metal-to-metal sealing contact with the stopper during rotation thereof, said rings confining the elastomer seals against pressure induced displacement from said clearance.

9. For use in a valve assembly having a body, the combination comprising
   a. a rotary plug stopper having an opening extending therethrough and defining a first axis;
   b. trunnion means mounting said stopper for rotation within the body about a second axis to carry said opening into and out of flow passing position;
   c. the body having inlet and outlet passages with which the stopper through opening registers in flow passing position, said passages defining a common axis,
   d. the stopper being spaced from the body and there being elastomeric material generally filling said space to seal off between the stopper and body, but without blocking said passages, said material defining a split in a plane extending in non-perpendicular relation to said axis such that the stopper opening is directly exposed to said split only when the stopper opening is rotated out of communication with said passages, and
   e. there being metallic seal rings bonded to said elastomeric material and extending in alignment with said passages at opposite sides of the stopper to have metal-to-metal sealing contact with the stopper during rotation thereof, said rings confining the elastomeric material against pressure induced displacement from said space and into said passages.

* * * * *